Aug. 22, 1972  D. B. CARSON  3,685,971
FLOW DISTRIBUTING APPARATUS
Filed July 6, 1970
Figure 1
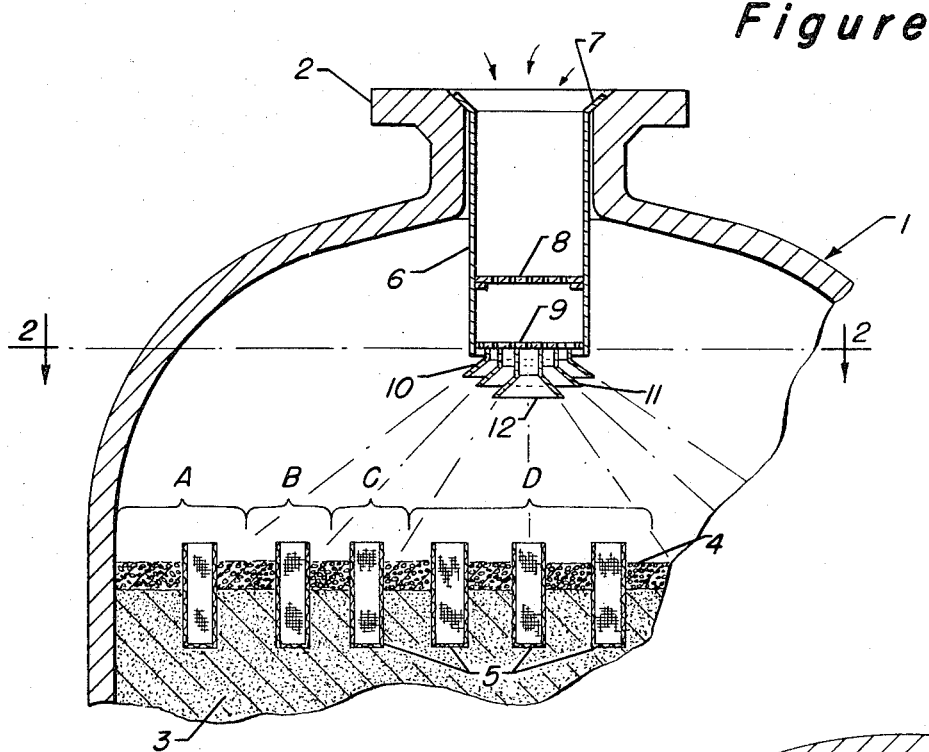
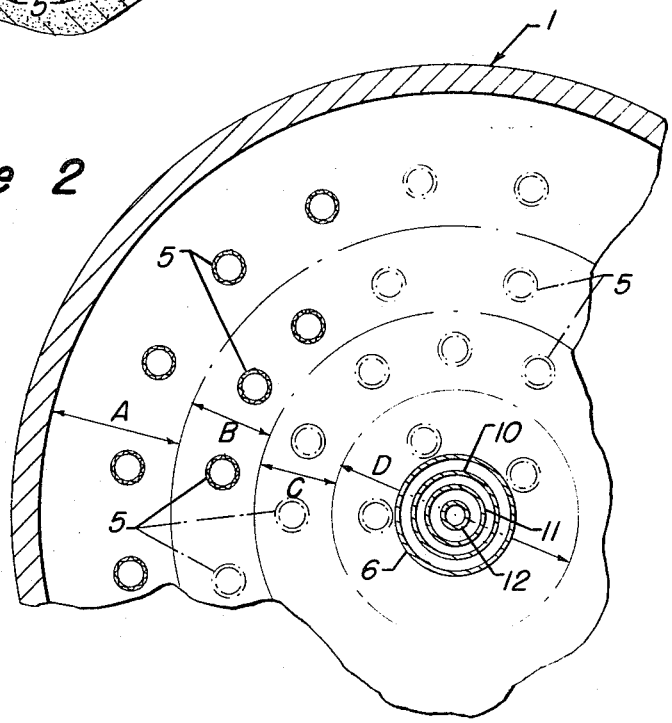
Figure 2
Figure 3
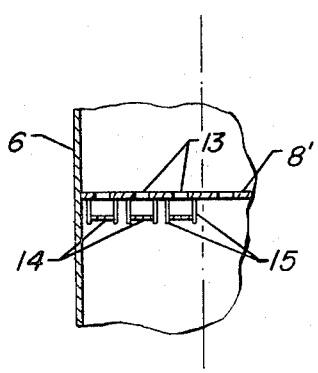
INVENTOR:
Don B. Carson
BY:
James R. Hoatson Jr.
Philip T. Liggett
ATTORNEYS

United States Patent Office 3,685,971
Patented Aug. 22, 1972

3,685,971
FLOW DISTRIBUTING APPARATUS
Don B. Carson, Mount Prospect, Ill., assignor to Universal Oil Products Company, Des Plaines, Ill.
Filed July 6, 1970, Ser. No. 52,163
Int. Cl. B01j 9/04; B05b 1/14
U.S. Cl. 23—288 R                                6 Claims

ABSTRACT OF THE DISCLOSURE

A flow distributor system for handling a mixed vapor-liquid flow to the top of a contact bed in a reactor chamber. The distributor utilizes transverse perforate plate means or other stream mixer means upstream of the discharge end and depending from the latter are a plurality of spaced apart concentric baffles that flare outwardly in a frusto-conical manner. The angle of flare for each baffle member can vary one from another to provide the desired proportional distribution of the mixed phase stream across the top of the bed in the contact chamber.

---

The present invention relates to simplified and improved flow stream distributing means for the top of a downflow catalyst containing reactor chamber or other unit accommodating a fixed bed of solid contact material. More particularly, the improvement is directed to a modified reactor or to a fluid distributor assembly for placement at the top of a downflow catalytic reactor which is adapted to receive and convert a mixed phase reactant stream.

Fixed bed reactors or contact chambers are widely utilized in the petroleum refining and chemical processing industries and the need to effect a uniform distribution of a charge stream to the contact bed is of importance in providing optimum use of the catalyst or other contact material. For example, there is the contacting of a gaseous, vaporous or mixed phase reactant stream with a solid particle-form catalyst in such processes as hydrodesulfurization of naphthas and distillates, naphtha reforming, hydrocracking of heavy oils, hydrogenation and hydrodealkylation of aromatic stacks, isomerization of normal paraffins, etc. Other than catalytic, operations may comprise the drying of wet streams with a desicant material or the separation of mixtures of compounds over a molecular sieve bed.

The downflow design for a fixed bed contactor, although widely used, does have the problem of having the upper surface of the bed becoming plugged with dirt, rust, scale, and other entrained foreign material. Various methods have been employed to collect dirt and alleviate plugging as well as effect uniform distribution of the inlet stream to the top of the bed; however, most apparatus has been complex and expensive. For instance, special tray designs have been used to traverse the entire cross-sectional area of the contact chamber. Layers of ceramic balls and a multiplicity of open, perforated cylinders or screen baskets, that extend down into and below the surface of the catalyst, have also been used to provide additional distribution area into the contact bed. Such baskets serve as further particle collection zones in addition to providing greater inlet area for the reactant stream into the fixed bed.

In the present instance, it is a principal object of the invention to provide a fluid distributor means that can project downwardly from a top inlet nozzle and serve to directly and uniformly deflect the reactant stream across the top of the contact bed so that intermediate distributing trays or baffles that extend across the entire chamber can be eliminated.

It may be considered a further object of the invention to use a distributor means which has relatively small conical-form baffle members in a concentric arrangement that can distribute across the interior portion of a chamber. Where desired, the top of the contact bed can be provided with a layer of inert balls and partially embedded perforated cylinders or screen baskets, or the like, along with the simplified distributor means.

In a broad aspect, the present invention provides a flow distributing apparatus for effecting a uniform distribution of a mixed phase fluid stream to the top of a contact bed in a reactor chamber, which comprises in combination, a tubular-form inlet member adapted to project downwardly into a contacting chamber to provide for mixed phase stream introduction to the contact bed therein, at least one perforate flow mixer means positioned transversely across said inlet member and spaced upstream from the discharge end thereof, a perforate distributor plate across the downstream end portion of said inlet member providing a uniform fluid flow and a second stage of mixed-phase mixing, and a plurality of depending, spaced apart, concentric and outwardly flaring frusto-conical baffle members below said distributor plate for effecting outward deflection for resulting concentric annular flow streams in a manner providing that the various portions of the mixed-phase stream flowing between such spaced concentric members will be deflected toward an equivalent portional area on the top of the contact bed in the reactor chamber.

In another embodiment, the present invention is directed to a fixed bed catalytic reactor adapted to accommodate a mixed phase stream, which comprises in combination, a vertically disposed enclosed chamber having an upper axially positioned inlet opening, a lower product stream outlet, and at least one internal bed of subdivided contact material which terminates short of the top of said chamber, a tubular-form fluid inlet member mounted within and projecting downwardly from said inlet opening to a level elevated above the top of an uppermost bed of said contact material, at least one transverse flow mixer means across the interior of said inlet member, and a plurality of spaced apart, concentric, and outwardly flaring conical-form baffle members depending below the end of said tubular-form inlet member, with the angle of flare for each baffle member being provided to deflect the total fluid stream from the inlet opening uniformly across the top of the contact bed in said reactor.

Generally, the tubular-form member will be sized to be a slip fit down through an upper nozzle or other form of inlet opening to the top of the reactor chamber such that it is readily adaptable for installation in any contact chamber which has a centrally positioned nozzle or inlet means. Also, inasmuch as the distributor device is particularly adapted to handle vapor-liquid phase streams, then at least one vapor-liquid mixing means is provided along the interior of the tubular-form member such that a substantially uniform mix of the reactant stream reaches the baffles or distributor plate means for subsequent distribution to the top of the fixed bed contact material in the chamber. The flow mixer means may comprise one or more perforate plate members, staggered bars or plates, or a combination of perforate plate and baffle plate means.

The conical-form baffle plates, or frustoconical members below the lower end of the inlet tube which are effective for shunting the flow stream in annular rings to the contact bed may have upper cylindrical or straight wall portions which, like the lower flared portions, shall be concentric with one another so as to provide uniform distribution for a full 360° around the distributor member and to the entire interior of the reactor chamber. As will be set forth and explained more fully hereinafter, the angle of flare for each of the conical-form baffle members will vary in accordance with the diameter of the interior contact bed to which the flow stream must be distributed as well as with respect to the distance of the baffle members above the top surface of the contact bed.

Reference to the accompanying drawing and the following description thereof serve to illustrate an embodiment of the present improved and simplified flow distributing apparatus for use with a chamber having a downflow through an internal fixed bed of contact material. Modifications and additional advantages of the present flow distributing system will also be set forth in connection with the description of the drawing.

FIG. 1 of the drawing is a partial sectional elevational view through the upper portion of a fixed bed reactor chamber with a superposed axially positioned distributor means.

FIG. 2 of the drawing is a partial sectional plan view, as indicated by the line 2—2 in FIG. 1, indicating that there is 360° distributed flow to the bed and to spaced, partially embedded basket means that will enhance fluid flow into the contact bed.

FIG. 3 indicates, in a partial sectional view, a modified form of flow stream mixer means which is positioned transversely across the interior portion of the tubular-form fluid inlet member.

Referring now particularly to FIGS. 1 and 2 of the drawing, there is indicated diagrammatically a contact chamber 1 having an upper nozzle 2 such that a fluid stream may be in a descending flow to the top of an internally disposed bed of catalyst or other contact material 3. In this instance, the latter is provided with an upper layer of inactive or non-adsorptive type of flow distribution balls 4 which, for example, may comprise refractory ceramic balls of about ¼" to 1" or more in diameter. In addition, there are indicated a plurality of spaced apart baskets 5 which may be made of heat resistant screen or of perforated plate. Generally, these baskets will be open-topped tubular cylinders and will be of the order of 3" to 6" or more in diameter and from about 1 ft. to 2 ft. in length such that there is, in effect, additional surface area for the distributed fluid stream to reach into and penetrate the contact bed 3. Experience has shown that where there is a tendency for the top layer of the contact material to become plugged with entrained material from the fluid stream that there can be a greater life and efficiency to the contact bed, without back flushing or replacement, through the use of cylindrical perforated basket members. In other words, the baskets can provide additional wall area for the downflowing reactant stream to reach an under-the-surface portion of the contact material 3.

In accordance with the present invention, the fluid inlet opening or nozzle 2 is provided with an insertable tubular form member 6 having a flared upper flange portion 7 adapted to rest or be supported from an upper flange portion for the nozzle 2. At an interior and intermediate transverse location, there is indicated a perforate plate member 8 which will assist in effecting a mixing of a vapor-liquid stream which may be introduced into the nozzle 2 and the tubular member 6. In addition, there is provided a perforated plate 9 that extends across the lower end of the tubular member 6 in a manner of a distribution orifice plate which will effect a uniform distribution and flow of the incoming fluid stream from the downstream end of the tubular member 6. Supported from the orifice plate and depending downwardly therefrom are a plurality of conical-form flared baffle members 10, 11 and 12. The latter shall be concentric one with another and spaced apart such that there are resulting annular streams formed from the total fluid stream descending into the contact chamber. The amount, or proportion, of the total fluid stream being deflected by any one of the baffle members to the top of the contact bed in chamber 1 will, of course, depend upon the number of baffles used and its spacing with respect to a next adjacent baffle member. For example, the upper end portion or periphery for baffle member 10 may be spaced radially a distance from the inside wall or tubular member 6 such that approximately 40% of the total fluid stream passing therethrough will reach the top flared portion of baffle member 10 such that an equivalent 40% portion will be deflected as an outer annular ring "A" at the top surface of distributor balls 4 on the contact bed 3 and over the outer row of basket means 5. Similarly, the angular flare of baffle member 11 will be such as to provide for a uniform annular distribution of a next adjacent ring of fluid material, as an annular band "B." The amount of fluid in band "B" is determined by the spacing between the upper periphery of baffle 10 and the upper periphery of baffle 11. In like manner, fluid flow around baffle 12 and through baffle 12 is such as to provide uniform distribution of fluid to a next annular ring "C" and to an inner circle of fluid "D."

It is again to be noted that the percentages of fluid flow between any set of adjacent baffles will be determined by the spacings between the upper peripheries of such baffles and the cross-sectional area provided by the annular ring therebetween with respect to the total cross-sectional area within tubular member 6. It should also be pointed out that the outer angle of flare for the conical-form baffle members 10 through 12 will depend upon the height of each baffle above the top of the contact bed 3, or the top of the layer of distributor balls 4. In other words, where each of the conical-form members are relatively close to the top of the contact bed, then the angle of flare will be greater with respect to a vertical axis through the distributing unit. Conversely, where the distance above the bed is greater, then the angle of flare with respect to the vertical axis will be substantially less. In any event, it is necessary that the angle of flare will vary from one conical-form baffle member to the next such that the distributed fluid flow of the inlet stream will be uniform across the entire upper surface of the contact bed with an assurance that the outer baffle member will deflect the outer annular stream of incoming liquid to the outer extremity of the contact bed in a manner to reach the inner wall of the contact chamber 1.

As one illustrative example of design and arrangement which utilizes 3 concentric conical-form baffle members at the lower end of the distributor tube 6, there may be an arrangement as shown in the drawing, with the outer baffle 10 effecting a deflection of approximately 40% of the inlet stream to an outer band "A" around the contact bed 3; the baffle member 11 deflecting a next annular ring of fluid to band "B" comprising approximately 30% of the fluid flow; baffle 12 being spaced from baffle 11 in a manner to provide a next annular band "C" of about 20% of the fluid flow; and an inner circle "D" of fluid distribution through the middle of conical member 12 comprising approximately 10% of the total of the fluid flow through the inlet member. However, it is to be noted that these percentages are merely illustrative and not limiting in any way inasmuch as a greater number of baffles may be used and different percentages of the fluid flow distributed in a larger number of bands or annular rings.

With respect to the plan view indicated in FIG. 2, there will be noted that where the larger percentage of the liquid is distributed in the outer band "A" that there are also provided a greater number of wire baskets 5 in an outer circular ring arrangement. Also, it will be noted that a decreasing number of baskets or perforate cylinder members are utilized in the next successive ring thereof toward the center of the chamber inasmuch as lesser amounts of fluid flow are reaching the next successive top portions of the contact bed in ring areas "B," "C" and "D." Again, it is to be noted that the arrangement of baskets is merely illustrative and a greater number of small baskets, or a staggered arrangement, may well be used to effect the desired downflow of liquid into the contact bed 3.

In FIG. 3 of the drawing, there is indicated the use of a modified mixer plate 8', for mixed phase fluid flow which has enlarged openings 13, and a sufficient number of such holes, to accommodate the downflow fluid entering nozzle 2. Below each of the holes 13 is provided a spaced baffle plate member 14 such that there is a deflection of the fluid downflow and a resulting mixing action between vapor and liquid. Each of the deflector plates or baffle plate members 14 may be supported by depending small rod members 15, or by other suitable means which will permit a large open area between the members 14 and the bottom of the plate 8'.

It will be noted that the present embodiment of FIG. 1 provides that each of conical-form baffle members 10, 11 and 12 have an upper cylindrical wall portion and a lower frustoconical portion; however, where desired in connection with a large distributom member, there may be the elimination of the upper vertical wall portion and the direct attachment of the small diameter ends of the frustoconical sections to the bottom face of plate 9 or to the lower end portion of the distributor tube means 6. In still another modification, although not shown in the drawing, there may be a transverse perforate member or directional vanes within the interior of the cone member 12 so as to effect a uniform distribution of fluid to the center portion "D" of the contact bed 3. Still other variations may include means for supporting the upper end portion of tubular member 6 on the top of the flange portion of nozzle 2; however, the tubular member 6 is preferably of cylindrical form so as to provide uniform distribution through a lower orifice plate, such as 9, and to the concentrically positioned conical-form baffle members. Also, the outer extremity of the larger cone shall be of less diameter than the inlet opening such that the entire distributor unit may be slipped downwardly through the interior or nozzle 2 for ready installation and removal with respect to chamber 1.

I claim as my invention:

1. A flow distributing apparatus for effecting a uniform distribution of a vapor-liquid mixed phase fluid stream to the top of a contact bed in a reactor chamber having an upper inlet opening, which comprises in combination, a tubular-form inlet member sized and adapted to slip fit through said inlet opening into said reactor chamber to provide for mixed phase stream introduction to the contact bed therein, at least one perforate flow mixer means positioned transversely across and within said inlet member and spaced upstream from the discharge end thereof, a perforate distributor plate within and across the downstream end portion of said inlet member providing uniform fluid and a second stage of mixed-phase mixing, and a plurality of depending, spaced apart, concentric frustoconical baffle members of a diameter not greater than said upper inlet opening below said distributor plate for effecting outward deflection for resulting concentric annular flow streams in a manner providing that the various portions of the mixed-phase stream flowing between such spaced concentric members will be deflected toward an equivalent proportional area on the top of the contact bed in the reactor chamber, said outwardly flaring baffle members depending from the lower end portions of spaced apart cylindrical members projecting downwardly from below said distributor plate, and the inner of said concentric members having an axial opening therethrough sufficient to accommodate a minor proportion of the fluid flow through said inlet member.

2. The flow distributing apparatus of claim 1 further characterized in that at least a portion of said outwardly flaring baffle members depend from the lower end portions of spaced apart cylindrical members projecting downwardly from below said distributor plate.

3. The flow distributing apparatus of claim 1 further characterized in that said tubular form inlet member is supported by said inlet opening.

4. The flow distributing apparatus of claim 1 further characterized in that said perforate flow mixer means comprises at least one transverse perforate plate member.

5. The flow distributing apparatus of claim 1 further characterized in that said perforate flow mixer means comprises at least one perforate plate member having relatively large open holes therethrough and supported at a spaced distance below each of said openings is a transverse deflector member whereby the downflowing fluid stream through said plate will be deflected and mixed by each of the plurality of deflector members.

6. The flow distributing apparatus of claim 1 further characterized in that said axial opening in said inner of said concentric members is of sufficient size to accommodate about 10% of the fluid flow through said inlet member.

References Cited
UNITED STATES PATENTS

| | | | |
|---|---|---|---|
| 2,996,361 | 8/1961 | Brumbaugh | 23—288 R |
| 2,916,360 | 12/1959 | Nicholl | 23—288 R |
| 2,568,875 | 9/1951 | Wethly et al. | 261—111 |
| 3,363,843 | 1/1968 | Ballard et al. | 239—504 |
| 2,962,224 | 11/1960 | Aghnides | 239—552 X |

JOSEPH SCOVRONEK, Primary Examiner

U.S. Cl. X.R.

34—95; 55—387, 389; 239—558, 590.3; 261—98